United States Patent
Lee et al.

(10) Patent No.: US 9,701,283 B2
(45) Date of Patent: Jul. 11, 2017

(54) WIPER BLADE ASSEMBLY

(71) Applicant: CAP CORPORATION, Sangju-si, Gyeongsangbuk-do (KR)

(72) Inventors: Sang Cheol Lee, Sangju-si (KR); Seung Chul Hyun, Ansan-si (KR)

(73) Assignee: CAP Corporation, Gyeongsangbuk-Do (KR)

( * ) Notice: Subject to any disclaimer, the term of this patent is extended or adjusted under 35 U.S.C. 154(b) by 322 days.

(21) Appl. No.: 14/318,485

(22) Filed: Jun. 27, 2014

(65) Prior Publication Data
US 2015/0000065 A1  Jan. 1, 2015

(30) Foreign Application Priority Data
Jul. 1, 2013 (KR) .................. 10-2013-0076451

(51) Int. Cl.
*B60S 1/38* (2006.01)
*B60S 1/40* (2006.01)

(52) U.S. Cl.
CPC ............ *B60S 1/3851* (2013.01); *B60S 1/387* (2013.01); *B60S 1/4016* (2013.01); *B60S 1/381* (2013.01); *B60S 1/3806* (2013.01); *B60S 1/3879* (2013.01)

(58) Field of Classification Search
CPC ...... B60S 1/387; B60S 1/3851; B60S 1/4016; B60S 1/3806
(Continued)

(56) References Cited

U.S. PATENT DOCUMENTS

| 2,031,297 A | 2/1936 | Anderson |
| 2,046,495 A | 7/1936 | Whitted |

(Continued)

FOREIGN PATENT DOCUMENTS

| DE | 1028896 | 4/1958 |
| DE | 1247161 | 8/1967 |

(Continued)

OTHER PUBLICATIONS

Chinese Office Action dated Sep. 18, 2016 for corresponding Chinese Patent Application No. 201480037314.7.
(Continued)

*Primary Examiner* — Michael Jennings
(74) *Attorney, Agent, or Firm* — Harness, Dickey & Pierce, P.L.C.

(57) ABSTRACT

A wiper blade assembly including a contact member, an elastic member which supports the contact member, a cover member which covers the elastic member, a coupling cover which covers the elastic member and has a housing portion, and an adapter which can be inserted into or removed from the housing portion of the coupling cover. The coupling cover has a first coupling portion located on a side of the housing portion, and the adapter has a second coupling portion located on a side thereof. The second coupling portion includes a pressure structure and a coupling structure separated from the pressure structure by a predetermined distance. The first coupling portion is coupled to the coupling structure. A structure for coupling the adapter to the coupling cover and a structure for separating the adapter from the coupling cover are provided separately. The adapter can be easily separated from the coupling cover.

7 Claims, 7 Drawing Sheets

(58) Field of Classification Search
USPC .................. 15/250.32, 250.43, 250.361
See application file for complete search history.

(56) References Cited

U.S. PATENT DOCUMENTS

| | | | |
|---|---|---|---|
| 2,697,241 A | 12/1954 | Oishei |
| 2,782,445 A | 2/1957 | Krohm |
| 2,782,447 A | 2/1957 | Anderson |
| 2,782,449 A | 2/1957 | Anderson |
| 2,814,820 A | 12/1957 | Elliott et al. |
| 2,920,336 A | 1/1960 | Anderson |
| 2,924,840 A | 2/1960 | Anderson |
| 2,974,341 A | 3/1961 | Hart |
| 3,088,155 A | 5/1963 | Smithers |
| 3,116,510 A | 1/1964 | Oishei et al. |
| 3,176,336 A | 4/1965 | Scinta |
| 3,179,969 A | 4/1965 | Glynn |
| 3,224,028 A | 12/1965 | Peras et al. |
| 3,605,168 A | 9/1971 | Moorhead et al. |
| 3,641,614 A | 2/1972 | Newsome |
| 3,798,703 A | 3/1974 | Den Berg et al. |
| 3,838,475 A | 10/1974 | Quinlan et al. |
| 3,845,519 A | 11/1974 | Quinlan et al. |
| 3,881,324 A | 5/1975 | Girquis |
| 3,885,265 A | 5/1975 | Deibel et al. |
| 4,063,328 A | 12/1977 | Arman |
| 4,083,642 A | 4/1978 | Journee |
| 4,094,038 A | 6/1978 | Hancu |
| 4,114,227 A | 9/1978 | Blackman |
| 4,296,521 A | 10/1981 | Mower |
| 4,300,259 A | 11/1981 | Maiocco |
| 4,324,019 A | 4/1982 | Mohnach et al. |
| 4,416,032 A | 11/1983 | Mohnach et al. |
| 4,438,543 A | 3/1984 | Noguchi et al. |
| 4,649,591 A | 3/1987 | Guerard |
| 4,802,257 A | 2/1989 | Edele et al. |
| 4,807,326 A | 2/1989 | Arai et al. |
| 4,852,206 A | 8/1989 | Fisher |
| 4,866,812 A | 9/1989 | Arai |
| 4,980,944 A | 1/1991 | Longman |
| 4,981,637 A | 1/1991 | Hyer |
| 5,048,146 A | 9/1991 | Cavenago |
| 5,145,274 A | 9/1992 | Schon |
| 5,283,925 A | 2/1994 | Maubray |
| 5,325,563 A | 7/1994 | Cayan |
| 5,325,564 A | 7/1994 | Swanepoel |
| 5,331,712 A | 7/1994 | Charng |
| 5,383,249 A | 1/1995 | Yang |
| 5,485,650 A | 1/1996 | Swanepoel |
| 5,493,750 A | 2/1996 | Bollen et al. |
| 5,553,962 A | 9/1996 | Eustache |
| 5,564,157 A | 10/1996 | Kushida et al. |
| 5,715,563 A | 2/1998 | Marks |
| 5,807,016 A | 9/1998 | Herring et al. |
| 5,819,361 A | 10/1998 | Merkel et al. |
| 5,885,023 A | 3/1999 | Witek et al. |
| 5,933,910 A | 8/1999 | Buechele et al. |
| 5,946,764 A | 9/1999 | Tworzydlo |
| 6,000,093 A | 12/1999 | Charng |
| 6,012,197 A | 1/2000 | Ponziani et al. |
| 6,055,697 A | 5/2000 | Wollenschlaeger |
| 6,158,078 A | 12/2000 | Kotlarski |
| 6,161,248 A | 12/2000 | Merkel et al. |
| 6,178,588 B1 | 1/2001 | Kotlarski |
| 6,192,546 B1 | 2/2001 | Kotlarski |
| 6,202,251 B1 | 3/2001 | Kotlarski |
| 6,226,829 B1 | 5/2001 | Kotlarski |
| 6,253,411 B1 | 7/2001 | Aichele et al. |
| 6,266,843 B1 | 7/2001 | Doman et al. |
| 6,279,191 B1 | 8/2001 | Kotlarski et al. |
| 6,292,974 B1 | 9/2001 | Merkel et al. |
| 6,295,690 B1 | 10/2001 | Merkel et al. |
| 6,305,066 B1 | 10/2001 | De Paoli et al. |
| 6,308,373 B1 | 10/2001 | Merkel et al. |
| 6,363,569 B1 | 4/2002 | Kotlarski |
| 6,367,117 B1 | 4/2002 | Sahara et al. |
| 6,397,428 B1 | 6/2002 | Kotlarski |
| 6,427,282 B1 | 8/2002 | Kotlarski |
| 6,427,283 B1 | 8/2002 | Dietrich et al. |
| 6,449,797 B1 | 9/2002 | De Block |
| 6,499,181 B1 | 12/2002 | Kotlarski |
| 6,516,491 B2 | 2/2003 | Merkel et al. |
| 6,523,218 B1 | 2/2003 | Kotlarski |
| 6,530,111 B1 | 3/2003 | Kotlarski |
| 6,539,576 B2 | 4/2003 | Kim |
| 6,550,096 B1 | 4/2003 | Stewart et al. |
| 6,553,607 B1 | 4/2003 | De Block |
| 6,581,237 B1 | 6/2003 | Kotlarski |
| 6,611,988 B1 | 9/2003 | De Block |
| 6,625,842 B1 | 9/2003 | De Block |
| 6,634,055 B1 | 10/2003 | De Block |
| 6,634,056 B1 | 10/2003 | De Block |
| 6,640,380 B2 | 11/2003 | Rosenstein et al. |
| 6,643,889 B1 | 11/2003 | Kotlarski |
| 6,668,419 B1 | 12/2003 | Kotlarski |
| 6,675,432 B1 | 1/2004 | De Block |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,718,594 B1 | 4/2004 | Kotlarski |
| 6,779,661 B1 | 8/2004 | Kotlarski |
| 6,782,581 B2 | 8/2004 | Block |
| 6,810,556 B1 | 11/2004 | Kotlarski |
| 6,813,803 B2 | 11/2004 | Leutsch |
| 6,836,926 B1 | 1/2005 | De Block |
| 6,836,927 B2 | 1/2005 | De Block et al. |
| 6,874,195 B2 | 4/2005 | Kotlarski et al. |
| 6,886,213 B2 | 5/2005 | Merkel et al. |
| 6,904,639 B2 | 6/2005 | Dietrich et al. |
| 6,910,244 B2 | 6/2005 | De Block et al. |
| 6,944,905 B2 | 9/2005 | De Block et al. |
| 6,973,698 B1 | 12/2005 | Kotlarski |
| 6,978,512 B2 | 12/2005 | Dietrich et al. |
| 7,007,339 B2 | 3/2006 | Weiler et al. |
| 7,143,463 B2 | 12/2006 | Baseotto et al. |
| 7,228,588 B2 | 6/2007 | Kraemer et al. |
| 7,293,321 B2 | 11/2007 | Breesch |
| 7,337,900 B2 | 3/2008 | Reiber et al. |
| 7,464,433 B2 | 12/2008 | Thomar et al. |
| 7,481,596 B2 | 1/2009 | Thienard |
| 7,484,264 B2 | 2/2009 | Kraemer et al. |
| 7,506,401 B2 | 3/2009 | Park |
| 7,523,519 B2 | 4/2009 | Egner-Walter et al. |
| 7,523,520 B2 | 4/2009 | Breesch |
| 7,540,061 B1 * | 6/2009 | Huang .............. B60S 1/3881 15/250.201 |
| 7,559,110 B1 | 7/2009 | Kotlarski et al. |
| 7,581,280 B2 | 9/2009 | Op't Roodt et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,721,382 B2 * | 5/2010 | Malone .............. B60S 1/3805 15/250.07 |
| 7,802,341 B2 | 9/2010 | Cempura et al. |
| 7,832,047 B2 | 11/2010 | Herinckx et al. |
| 7,836,541 B2 | 11/2010 | Harita et al. |
| 7,836,542 B2 | 11/2010 | Dietrich et al. |
| 7,950,101 B2 | 5/2011 | Kim |
| 8,151,406 B2 | 4/2012 | Machida et al. |
| 8,181,308 B2 | 5/2012 | Kwon et al. |
| 8,191,200 B2 | 6/2012 | Kim |
| 8,196,255 B2 | 6/2012 | De Block et al. |
| 8,266,759 B2 | 9/2012 | Braun et al. |
| 8,272,096 B2 | 9/2012 | Wilms et al. |
| 8,286,298 B2 | 10/2012 | Kim |
| 8,347,450 B2 | 1/2013 | Amano |
| 8,510,898 B2 | 8/2013 | Ku |
| 2003/0014828 A1 | 1/2003 | Edner-Walter et al. |
| 2003/0066153 A1 | 4/2003 | Rosenstein et al. |
| 2004/0074037 A1 | 4/2004 | Op't Roodt |
| 2005/0177970 A1 | 8/2005 | Scholl et al. |
| 2006/0207050 A1 * | 9/2006 | Shanmugham ...... B60S 1/381 15/250.43 |
| 2006/0218740 A1 | 10/2006 | Coughlin |

(56) References Cited

U.S. PATENT DOCUMENTS

| | | | |
|---|---|---|---|
| 2007/0192984 A1 | 8/2007 | Park | |
| 2007/0199174 A1 | 8/2007 | Op't Roodt | |
| 2007/0226940 A1 | 10/2007 | Thienard | |
| 2007/0234501 A1 | 10/2007 | Ho et al. | |
| 2008/0201892 A1 | 8/2008 | Fujiwara et al. | |
| 2008/0235896 A1* | 10/2008 | Cheng | B60S 1/3881 15/250.201 |
| 2008/0289133 A1 | 11/2008 | Kim | |
| 2009/0113653 A1 | 5/2009 | Thienard | |
| 2009/0307862 A1 | 12/2009 | Boland | |
| 2010/0050361 A1 | 3/2010 | Chang et al. | |
| 2010/0186185 A1 | 7/2010 | Grasso et al. | |
| 2010/0205763 A1 | 8/2010 | Ku | |
| 2010/0242204 A1* | 9/2010 | Chien | B60S 1/381 15/250.201 |
| 2010/0281645 A1* | 11/2010 | Kim | B60S 1/3801 15/250.32 |
| 2011/0047740 A1* | 3/2011 | Weber | B60S 1/3856 15/250.32 |
| 2011/0047742 A1* | 3/2011 | Kim | B60S 1/3858 15/250.32 |
| 2011/0056041 A1 | 3/2011 | Wu | |
| 2011/0083295 A1 | 4/2011 | Kim et al. | |
| 2011/0162162 A1* | 7/2011 | Fujiwara | B60S 1/3808 15/250.361 |
| 2011/0277264 A1* | 11/2011 | Ehde | B60S 1/3863 15/250.32 |
| 2012/0060315 A1 | 3/2012 | Avasiloaie et al. | |
| 2012/0060316 A1* | 3/2012 | Avasiloaie | B60S 1/381 15/250.33 |
| 2012/0180245 A1* | 7/2012 | Ku | B60S 1/3801 15/250.32 |
| 2013/0117957 A1* | 5/2013 | Ku | B60S 1/4019 15/250.201 |
| 2013/0255025 A1 | 10/2013 | Song et al. | |
| 2013/0305475 A1 | 11/2013 | Kim et al. | |
| 2013/0340197 A1* | 12/2013 | Song | B60S 1/3801 15/250.201 |

FOREIGN PATENT DOCUMENTS

| | | | |
|---|---|---|---|
| DE | 2313939 | 9/1974 | |
| DE | 2640399 | 3/1977 | |
| DE | 3222864 | 12/1983 | |
| DE | 19627115 | 1/1998 | |
| DE | 19729865 | 1/1999 | |
| DE | 19734843 | 2/1999 | |
| DE | 19736368 | 2/1999 | |
| DE | 19814610 | 10/1999 | |
| DE | 19856299 | 6/2000 | |
| DE | 19856300 | 6/2000 | |
| DE | 102011007247 A1 * | 10/2012 | B60S 1/3858 |
| EP | 0316114 | 5/1989 | |
| EP | 0528643 | 2/1993 | |
| EP | 0594451 | 4/1994 | |
| EP | 0646507 | 4/1995 | |
| EP | 1256496 | 11/2002 | |
| EP | 1257445 | 11/2002 | |
| EP | 1849666 | 10/2007 | |
| FR | 2222855 | 10/1974 | |
| FR | 2731191 | 9/1996 | |
| FR | WO 2008145481 A1 * | 12/2008 | B60S 1/387 |
| GB | 1425568 | 2/1976 | |
| GB | 2313042 | 11/1997 | |
| JP | S55155014 U | 11/1980 | |
| JP | H04108470 | 9/1992 | |
| JP | 2001260823 | 9/2001 | |
| JP | 2003312451 | 11/2003 | |
| JP | 2006507991 | 3/2006 | |
| JP | 2006519721 | 8/2006 | |
| JP | 2006525903 | 11/2006 | |
| JP | 2008218552 | 9/2008 | |
| JP | 2008230340 | 10/2008 | |
| JP | 2008539115 | 11/2008 | |
| JP | 2011251567 | 12/2011 | |
| JP | 2012102788 A | 5/2012 | |
| KR | 100678408 | 1/2007 | |
| KR | 100692369 | 3/2007 | |
| KR | 1020080099013 | 11/2008 | |
| KR | 1020080105227 | 12/2008 | |
| KR | 1020080108360 | 12/2008 | |
| KR | 100891195 | 4/2009 | |
| KR | 1020090042785 | 4/2009 | |
| KR | 1020090100975 | 9/2009 | |
| KR | 1020090115144 | 11/2009 | |
| KR | 10-2010-0023906 A | 3/2010 | |
| KR | 200049008 | 6/2010 | |
| KR | 10-1036579 B1 | 5/2011 | |
| KR | 10-1201547 B1 | 11/2012 | |
| KR | 101201547 | 11/2012 | |
| KR | 20130051113 A | 5/2013 | |
| KR | 10-2013-0065143 A | 6/2013 | |
| WO | 9532112 | 11/1995 | |
| WO | 9801327 | 1/1998 | |
| WO | 9902382 | 1/1999 | |
| WO | 9902383 | 1/1999 | |
| WO | 9910211 | 3/1999 | |
| WO | 9912784 | 3/1999 | |
| WO | 0034090 | 6/2000 | |
| WO | 0038962 | 7/2000 | |
| WO | 0038964 | 7/2000 | |
| WO | 0048877 | 8/2000 | |
| WO | 0050276 | 8/2000 | |
| WO | 0149537 | 7/2001 | |
| WO | 0162561 | 8/2001 | |
| WO | 2006106006 | 10/2006 | |
| WO | 2007102404 | 9/2007 | |
| WO | 2008019903 | 2/2008 | |
| WO | 2008101561 | 8/2008 | |
| WO | WO-2012063660 A1 | 5/2012 | |

OTHER PUBLICATIONS

International Search Report dated Oct. 27, 2014 for corresponding PCT Application No. PCT/KR2014/005663.
Japanese Office Action dated Dec. 20, 2016 for corresponding JP Application 2016-523646.

\* cited by examiner

WIPER BLADE ASSEMBLY

CROSS-REFERENCE TO RELATED APPLICATIONS

This application claims priority from Korean Patent Application No. 10-2013-0076451 filed on Jul. 1, 2013 in the Korean Intellectual Property Office, the disclosure of which is incorporated herein by reference in its entirety.

TECHNICAL FIELD

The present invention relates to a wiper blade assembly, and more particularly, to a wiper blade assembly in which a coupling cover and an adapter can be easily separated from each other.

BACKGROUND

A wiper blade assembly is disposed on a windshield of a vehicle to remove foreign substances and wipe the rain water away in the event of rain in order to ensure a driver's field of view. The wiper blade assembly is driven by being connected to a wiper arm which is connected to a driving shaft connected to a wiper driving motor of the vehicle.

In this case, the wiper arm is coupled to the wiper blade assembly through a wiper connecter. Generally, the wiper blade assembly is provided with a clamp, and a connecter is fastened to the clamp. In a state where the connecter is fastened to the clamp, the wiper arm is fastened to the connecter.

Meanwhile, the types of the wiper blade assembly may be largely classified into a conventional type and a flat type according to the structure of the blade.

A general wiper blade assembly includes an contact member to remove foreign substances attached to a window, an elastic member to support the contact member, and cover members to cover ends of the elastic member.

A conventional wiper blade assembly includes a coupling cover coupled to an elastic member. The coupling cover may include a structure that can be coupled to an adapter.

For example, Korean Patent Registration No. 1201547 discloses "Wiper Blade Assembly." FIGS. 4A through 4D of the above patent illustrate a clamp which is coupled to an elastic member, a coupling cover which covers the clamp and includes a housing portion, and an adapter which can be inserted into or removed from the housing portion of the coupling cover.

The adapter includes a body which is inserted into the housing portion, a support protrusion which is formed at an end of the body and supported by the coupling cover, and an elastic protrusion which is formed at the other end of the body and is caught on the coupling cover and thus supported by the coupling cover. Accordingly, the adapter can be coupled to or separated from the coupling cover.

In the above patent, the elastic protrusion should be pushed toward the inside of the coupling cover in a lengthwise direction of the coupling cover in order to separate the coupling cover and the adapter from each other. However, since a protruding height of the elastic protrusion from the coupling cover is small, it is not easy to separate the adapter from the coupling cover.

SUMMARY

Aspects of the present invention provide a wiper blade assembly in which a coupling cover and an adapter can be easily separated from each other.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a wiper blade assembly comprising: an contact member; an elastic member which supports the contact member; a cover member which covers the elastic member; a coupling cover which covers the elastic member and comprises a housing portion; and an adapter which can be inserted into or removed from the housing portion of the coupling cover, wherein the coupling cover comprises a first coupling portion located on a side of the housing portion, and the adapter comprises a second coupling portion located on a side thereof, wherein the second coupling portion comprises a pressure structure and a coupling structure which is separated from the pressure structure by a predetermined distance, and the first coupling portion is coupled to the coupling structure.

Further, in the wiper blade assembly of the present invention, the first coupling portion includes a first protruding portion which extends in a heightwise direction of the coupling cover and a second protruding portion which extends in a lengthwise direction of the coupling cover, and the second protruding portion comprises a locking bump which extends to a predetermined length and a protrusion which extends in the same direction as the locking bump and extends to a length greater than the predetermined length of the locking bump.

Further, in the wiper blade assembly of the present invention, the pressure structure includes a first pressure portion and a second pressure portion which extend from a side of a body of the adapter and a connecting portion which connects the first pressure portion and the second pressure portion, wherein the connecting portion comprises a first connecting portion connected to the first pressure portion, a second connecting portion connected to the second pressure portion, and a pressure point located in an area where the first connecting portion and the second connecting portion contact each other.

Further, in the wiper blade assembly of the present invention, a side of the first pressure portion includes a first connecting point connected to the side of the body of the adapter and a second connecting point connected to the first connecting portion, and a side of the second pressure portion comprises a third connecting point connected to the side of the body of the adapter and a fourth connecting point connected to the second connecting portion.

Further, in the wiper blade assembly of the present invention, the coupling structure includes a first support, a second support separated from the first support by a predetermined distance, a first coupling groove formed by the predetermined distance between the first support and the second support, and a second coupling groove extending from the first coupling groove.

Further, in the wiper blade assembly of the present invention, the first support includes a first lengthwise support extending in a lengthwise direction of the adapter and a first widthwise support extending in a widthwise direction of the adapter, and the second support comprises a second lengthwise support extending in the lengthwise direction of the adapter and a second widthwise support extending in the widthwise direction of the adapter.

Further, in the wiper blade assembly of the present invention, the first coupling groove is formed by a gap between the first lengthwise support and the second lengthwise support, and the second coupling groove is formed by a gap between the first widthwise support and the second widthwise support.

Further, in the wiper blade assembly of the present invention, the locking bump is located in the first coupling groove, and the protrusion is located in the second coupling groove, wherein the second coupling portion of the adapter is coupled to the first coupling portion of the coupling cover as the locking bump is caught on the first widthwise support and the second widthwise support.

Further, in the wiper blade assembly of the present invention, if the second connecting point and the fourth connecting point are pressed in a widthwise direction, the pressure point pushes the protrusion of the adapter in a lengthwise direction, and the pushed protrusion pushes the locking bump in the lengthwise direction, which causes the locking bump caught on the first widthwise support and the second widthwise support to be separated from the first widthwise support and the second widthwise support, thereby separating the second coupling portion of the adapter from the first coupling portion of the coupling cover.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The present invention will now be described more fully hereinafter with reference to the accompanying drawings, in which preferred embodiments of the invention are shown. The same reference numbers indicate the same components throughout the specification. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

The terminology used herein is for the purpose of describing particular embodiments only and is not intended to be limiting of the invention. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, an embodiment of the present invention will be described in detail with reference to the accompanying drawings.

Figure 1A:
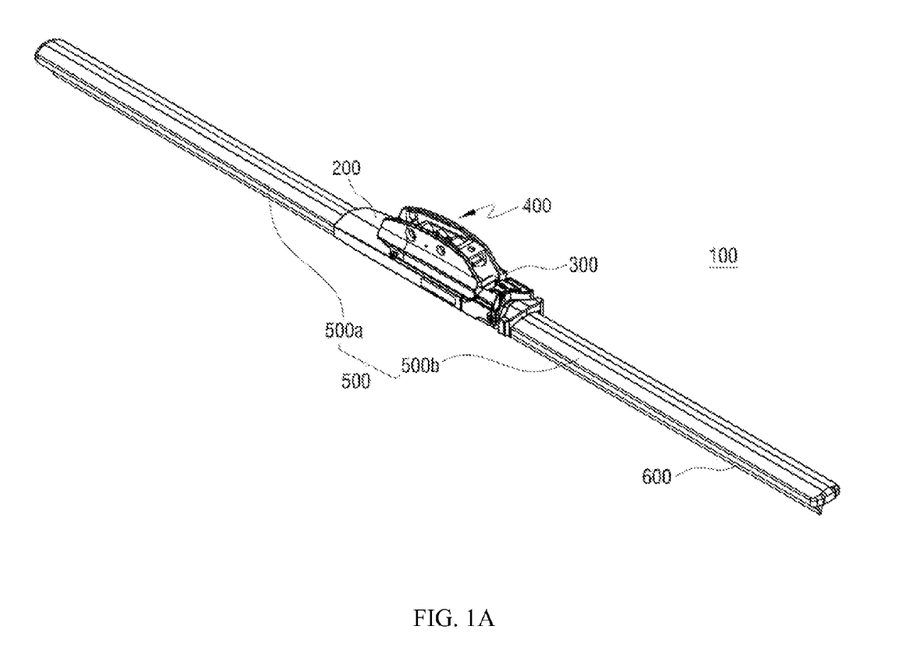
FIG. 1A is a coupled perspective view of a wiper blade assembly according to the present invention.
Figure 1B:
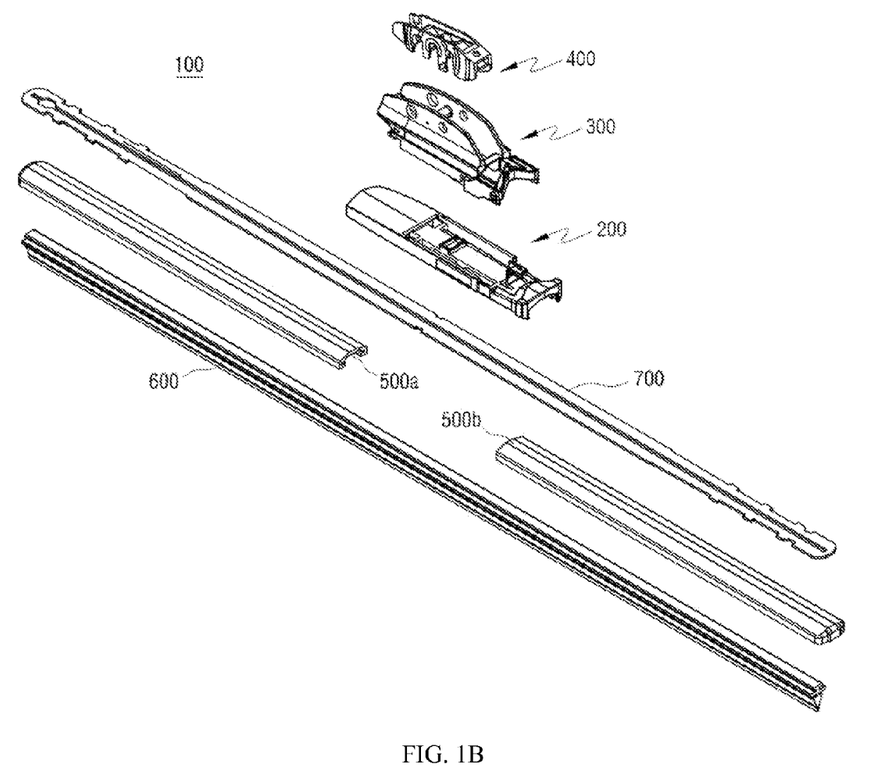
FIG. 1B is an exploded perspective view of the wiper blade assembly according to the present invention.

FIG. 1A is a coupled perspective view of a wiper blade assembly 100 according to the present invention. FIG. 1B is an exploded perspective view of the wiper blade assembly 100 according to the present invention.

Referring to FIGS. 1A and 1B, the wiper blade assembly 100 according to the present invention includes a rubber contact member 600 which contacts the windshield of a vehicle, an elastic member 700 which supports the contact member 600, and a pair of cover members 500a and 500b which cover the elastic member 700. In addition, the wiper blade assembly 100 includes a coupling cover 200 which is located in a predetermined area of the wiper blade assembly 100 in a lengthwise direction of the wiper blade assembly 100 and includes a housing portion.

As will be described later, the coupling cover 200 according to the present invention is coupled to the elastic member 700 while covering a predetermined area of the elastic member 700. This will be described later.

Referring continuously to FIGS. 1A and 1B, the wiper blade assembly 100 according to the present invention includes an adapter 300 which can be inserted into or removed from the housing portion of the coupling cover 200. The adapter 300 can be coupled to various forms of connectors.

Although not shown in the drawings, a wiper arm is coupled to a connector 400. Thus, the wiper blade assembly 100 may be driven by power delivered from the wiper arm.

In the drawings, the coupling cover 200 is located in a middle area of the wiper blade assembly 100 in the lengthwise direction of the wiper blade assembly 100. However, the coupling cover 200 can also be located in a peripheral area of the wiper blade assembly 100 in the lengthwise direction of the wiper blade assembly 100. Therefore, in the present invention, the position of the coupling cover 200 is not limited to a particular position.

The wiper blade assembly 100 according to the present invention relates to the coupling structure of the coupling cover 200 and the adapter 300 that can be inserted into or removed from the housing portion of the coupling cover 200. The coupling structure of the coupling cover 20 and the adapter 300 will now be described in detail.

Figure 2A:
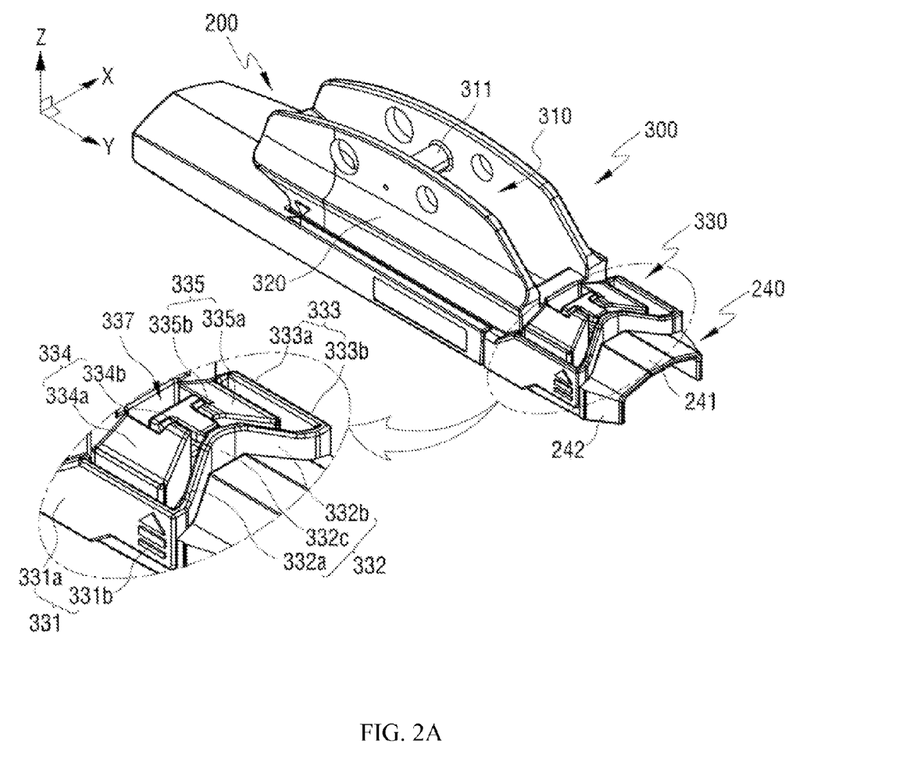
FIGS. 2A through 2C are perspective views illustrating the coupling structure of a coupling cover and an adapter in the wiper blade assembly according to the present invention.
Figure 2B:
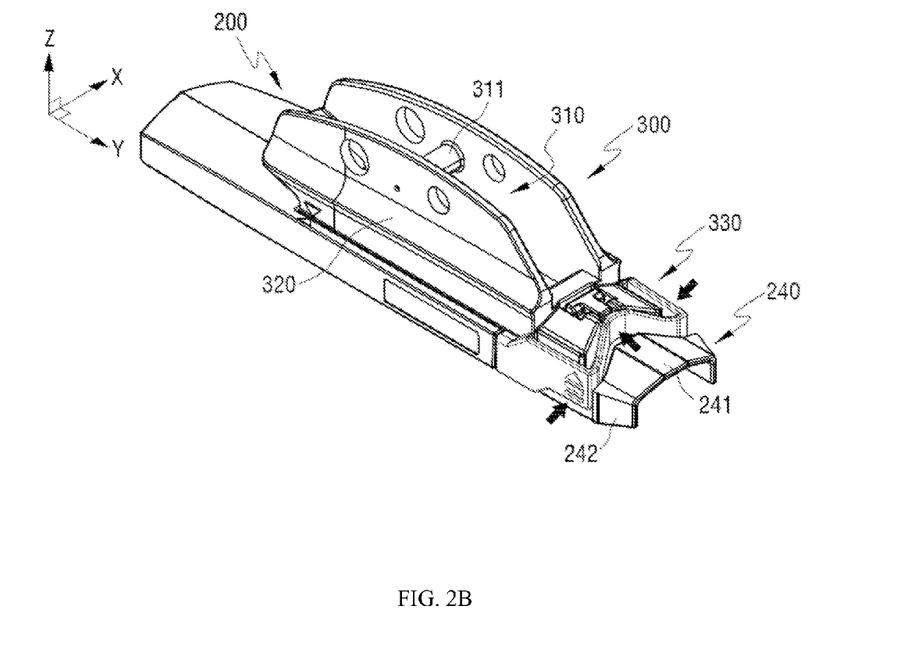
Figure 2C:
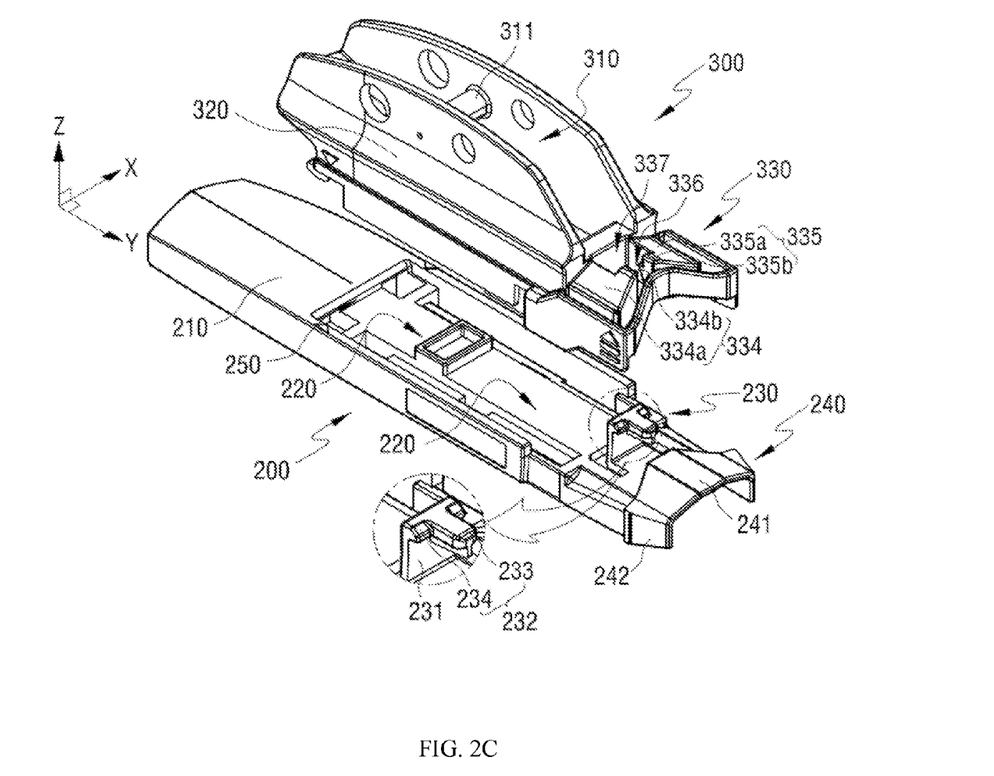

FIGS. 2A through 2C are perspective views illustrating the coupling structure of the coupling cover 200 and the adapter 300 in the wiper blade assembly 100 according to the present invention.

Specifically, FIG. 2A is a perspective view of the coupling cover 200 and the adapter 300 coupled to each other. FIG. 2B is a perspective view of a process of separating the adapter 300 from the coupling cover 200. FIG. 2C is a perspective view of the coupling cover 200 and the adapter 300 separated from each other.

Referring to FIGS. 2A through 2C, the coupling cover 200 of the wiper blade assembly 100 according to the present invention includes a body 210, and a housing portion 220 is formed in a predetermined area of the body 210. That is, the adapter 300 can be coupled to the housing portion 220.

A first coupling portion 230 is provided at a side of the housing portion 220, and a third coupling portion 250 is provided at the other side of the housing portion 220.

The first coupling portion 230 includes a first protruding portion 231 extending in a heightwise direction Z of the coupling cover 200 and a second protruding portion 232 extending in a lengthwise direction Y of the coupling cover 200.

An end of the first protruding portion 231 extends from a predetermined area of the housing portion 220, and the other end of the first protruding 231 extends to the second protruding 232.

In addition, the second protruding portion 232 includes a locking bump 234 which extends to a predetermined length and a protrusion 233 which extends in the same direction as the locking bump 234 and extends to a length greater than the length of the locking bump 234.

The third coupling portion 250 may be formed in the form of coupling grooves or coupling holes. Therefore, in the present invention, the adapter 300 can be coupled to the housing portion 220 by the first coupling portion 230 and the third coupling portion 250. This will be described later.

Referring continuously to FIGS. 2A through 2C, the coupling cover 200 of the wiper blade assembly 100 according to the present invention includes an auxiliary body 240 located in a predetermined direction of the body 210, specifically, a direction in which the protrusion 233 extends. The auxiliary body 240 includes a horizontal auxiliary body 241 and a vertical auxiliary body 242. The vertical auxiliary body 242 protrudes in a widthwise direction X of the auxiliary body 240. This will be described later.

The adapter 300 of the wiper blade assembly 100 according to the present invention includes a body 320, and a housing portion 310 is formed in a predetermined area of the body 320. In addition, a connecting pin 311 may be located inside the housing portion 310. That is, the connector 400 of FIG. 1B can be coupled to the housing portion 310 of the adapter 300. This is obvious to those of ordinary skill in the art, and thus a detailed description thereof will be omitted.

The adapter 300 includes a second coupling portion 330 located on a side of the body 320 and a fourth coupling portion (not shown) located on the other side of the body 320.

The second coupling portion 330 includes a pressure structure, and the pressure structure includes a first pressure portion 331 and a second pressure portion 333 which extend from a side of the body 320 and a connecting portion 332 which connects the first pressure portion 331 and the second pressure portion 333.

The connecting portion 332 includes a first connecting portion 332 connected to the first pressure portion 331 and a second connecting portion 332b connected to the second pressure portion 333. The connecting portion 332 further includes a pressure point 332c located in an area where the first connecting portion 332a and the second connecting portion 332b contact each other.

In addition, a side of the first pressure portion 331 includes a first connecting portion 331a connected to a side of the body 320 and a second connecting point 331b connected to the first connecting portion 332a. A side of the second pressure portion 333 includes a third connecting point 333a connected to the side of the body 320 and a fourth connecting point 333b connected to the second connecting portion 332b.

That is, as shown in the drawings, the first pressure portion 331, the connecting portion 332, and the second pressure portion 333 of the pressure structure are connected to each other to form an "M" shape, and a side of the first pressure portion 331 and a side of the second pressure portion 333 are connected to the body 320.

Referring continuously to FIGS. 2A through 2C, the second coupling portion 330 of the adapter 300 of the wiper blade assembly 100 according to the present invention includes a coupling structure which is located inside the pressure structure and separated from the pressure structure by a predetermined distance.

The coupling structure includes a first support 334 and a second support 335 which is separated from the first support 334 by a predetermined distance.

In addition, the coupling structure includes a first coupling groove 337 which is formed by the predetermined distance between the first support 334 and the second support 335 and a second coupling groove 336 which extends from the first coupling groove 337.

More specifically, the first support 334 includes a first lengthwise support 334a which extends in the lengthwise direction Y of the adapter 300 and a first widthwise support 334b which extends in the widthwise direction X of the adapter 300. The second support 335 includes a second lengthwise support 335a which extends in the lengthwise direction Y of the adapter 300 and a second widthwise support 335b which extends in the widthwise direction X of the adapter 300.

In addition, the first coupling groove 337 is formed by a gap between the first lengthwise support 334a and the second lengthwise support 335a, and the second coupling groove 336 is formed by a gap between the first widthwise support 334b and the second widthwise support 335b.

The coupling and separation of the coupling cover 200 and the adapter 300 will now be described.

FIG. 2A illustrates the coupling cover 200 and the adapter 300 coupled to each other. Referring to reference numerals of FIGS. 2A through 2C, a fourth coupling portion 340 (see FIG. 3A) of the adapter 300 is coupled to the third coupling portion 250 of the coupling cover 200 of FIG. 2C. Then, the second coupling portion 330 of the adapter 300 and the first coupling portion 230 of the coupling cover 200 are coupled to each other.

When the second coupling portion 330 of the adapter 300 is coupled to the first coupling portion 230 of the coupling cover 200, the second protruding portion 232 which extends in the lengthwise direction Y of the coupling cover 200 is located in the first coupling groove 337 formed by a gap between the first support 334 and the second support 335 and the second coupling groove 336 which extends from the first coupling groove 337.

Specifically, the second protruding portion 232 includes the locking bump 234 which extends to a predetermined length and the protrusion 233 which extends in the same direction as the locking bump 234 and extends to a length greater than the length of the locking bump 234.

In addition, the first support 334 includes the first lengthwise support 334a which extends in the lengthwise direction Y of the adapter 300 and the first widthwise support 334b which extends in the widthwise direction X of the adapter 300. The second support 335 includes the second lengthwise support 335a which extends in the lengthwise direction Y of the adapter 300 and the second widthwise support 335b which extends in the widthwise direction X of the adapter 300.

The first coupling groove 337 may be formed by the gap between the first lengthwise support 334a and the second lengthwise support 335a, and the second coupling groove 336 may be formed by the gap between the first widthwise support 334b and the second widthwise support 335b.

In this case, the locking bump 234 may be located in the first coupling groove 337, and the protrusion 233 may be located in the second coupling groove 336.

The locking bump 234 may be caught on the first widthwise support 334b and the second widthwise support 335b, thereby preventing the second coupling portion 330 of the adapter 300 from be separated from the first coupling portion 230 of the coupling cover 200.

FIG. 2B illustrates the process of separating the adapter 300 from the coupling cover 200. The adapter 300 can be separated from the coupling cover 200 using the pressure structure of the second coupling portion 330 of the adapter 300.

More specifically, the pressure structure includes the first pressure portion 331 and the second pressure portion 333 which extend from a side of the body 320 and the connecting portion 332 which connects the first pressure portion 331 and the second pressure portion 333.

In addition, a side of the first pressure portion 331 includes the first connecting point 331a connected to the side of the body 320 and the second connecting point 331b connected to the first connecting portion 332a. A side of the second pressure portion 333 includes the third connecting point 333a connected to the side of the body 320 and the fourth connecting point 333b connected to the second connecting portion 332b.

Here, the first connecting point 331a and the third connecting point 333a connected to the body 320 are fixed in position and provide a reference point in the fixed state. If a user presses the second connecting point 331b and the fourth connecting point 333b in the widthwise direction, the pressure point 332c located in the area where the first connecting portion 332a and the second connecting portion 332b contact each other is moved in the lengthwise direction (i.e., in an opposite direction to Y of FIG. 2B) by the pressing force.

As the pressure point 332c is moved in the lengthwise direction, it pushes the protrusion 233 of the adapter 300 in the lengthwise direction (in the opposite direction to Y of FIG. 2B), thereby pushing the locking bump 234 in the lengthwise direction (in the opposite direction to Y of FIG. 2B). This causes the locking bump 234 caught on the first widthwise support 334b and the second widthwise support 335b to be separated from the first widthwise support 334b and the second widthwise support 335b. Consequently, the second coupling portion 330 of the adapter 300 is separated from the first coupling portion 230 of the coupling cover 200.

Finally, if the fourth coupling portion 340 (see FIG. 3A) of the adapter 300 is separated from the third coupling portion 250 of the coupling cover 200, the coupling cover 200 and the adapter 300 are separated from each other as shown in FIG. 2C.

As described above, in the conventional art, an elastic protrusion is pushed toward the inside of a coupling cover in a lengthwise direction of the coupling cover in order to separate the coupling cover from an adapter. However, since a protruding height of the elastic protrusion from the coupling cover is small, it is not easy to separate the adapter from the coupling cover.

In the present invention, however, a structure for coupling the adapter 300 to the coupling cover 200 and a structure for separating the adapter 300 from the coupling cover 200 are provided separately. Therefore, the adapter 300 can be easily separated from the coupling cover 200.

In addition, in the present invention, the pressure structure formed on a side surface of the adapter 300 can be pressed not on a top surface of the coupling cover 200 but on a side surface of the coupling cover 200 without being constrained by other parts. Therefore, the adapter 300 can be easily separated from the coupling cover 200.

As described above, the coupling cover 200 of the wiper blade assembly 100 according to the present invention includes the auxiliary body 240 located in a predetermined direction of the body 210, specifically, a direction in which the protrusion 233 extends. The auxiliary body 240 includes the horizontal auxiliary body 241 and the vertical auxiliary body 242. The vertical auxiliary body 242 protrudes in the widthwise direction X of the auxiliary body 240.

In the present invention, since a separable part can be pressed not on the top surface of the coupling cover 200 but on the side surface of the coupling cover 200 without being constrained by other parts as described above, the adapter 300 can be easily separated from the coupling cover 200.

For this reason, however, the separable part located on a side surface of the adapter 300 can be pressed against the intention of a user, thereby separating the adapter 300 from the coupling cover.

Therefore, in the present invention, a height of the vertical auxiliary body 242 which protrudes in the widthwise direction X of the auxiliary body 240 is made to be equal to or greater than that of a surface of the first pressure portion 331 and a surface of the second pressure portion 333, thereby preventing the first pressure portion 331 and the second pressure portion 333 from being pressed unintentionally.

Figure 3A:
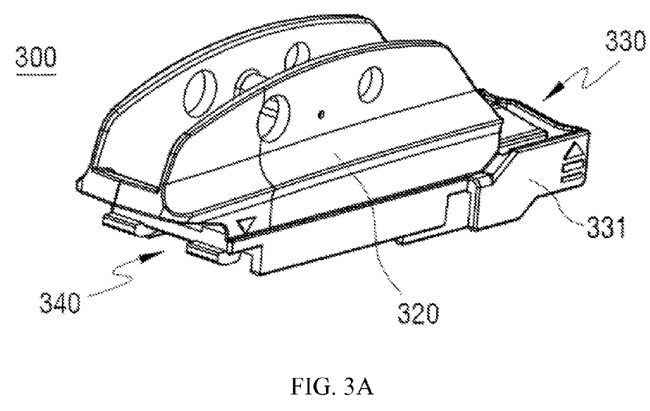
FIG. 3A is a perspective view of the adapter of the present invention viewed in another direction.
Figure 3B:
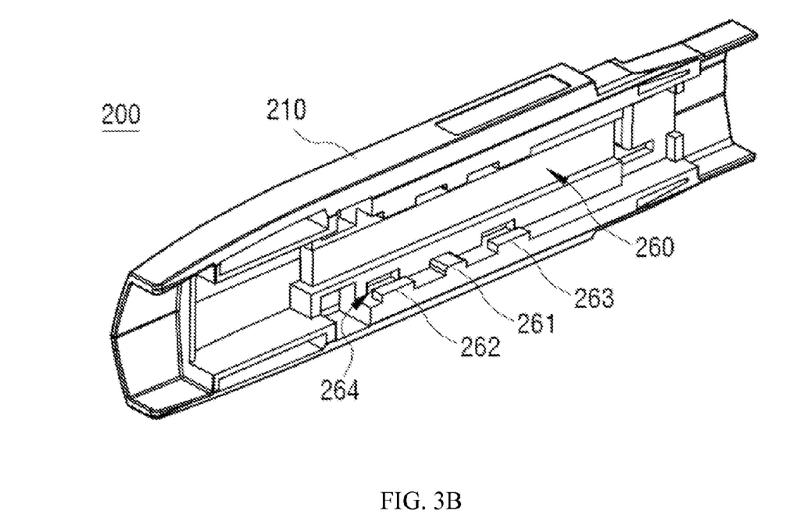
FIG. 3B is a perspective view of the coupling cover of the present invention viewed in another direction.

FIG. 3A is a perspective view of the adapter 300 of the present invention viewed in another direction. FIG. 3B is a perspective view of the coupling cover 200 of the present invention viewed in another direction.

Referring to FIG. 3A, the adapter 300 includes the second coupling portion 330 located on a side of the body 320 and the fourth coupling portion 340 located on the other side of the body 320.

The fourth coupling portion 340 may be formed in the form of support protrusions, and the support protrusions may be inserted into the coupling grooves or holes of the third coupling portion 250 of FIG. 2C. Accordingly, the other side of the adapter 300 may be coupled to the other side of the coupling cover 200.

Referring to FIG. 3B, a housing portion 260 for housing an elastic member which will be described later is formed on a bottom surface of the coupling cover 200. Each of both side surfaces of the housing portion 260 includes a fixing portion 261 which extends in a widthwise direction of the elastic member and support portions 262 and 263 which are separated from the fixing portion 261 by a predetermined distance and extend in the widthwise direction of the elastic member.

The support portions 262 and 263 may include coupling grooves 264 into which a side surface of the elastic member can be inserted.

As described above, the coupling cover 200 according to the present invention may be coupled to the elastic member while covering a predetermined area of the elastic member.

That is, a conventional wiper blade includes a clamp coupled to the elastic member, and the clamp is housed in the coupling cover.

In the present invention, however, the elastic member can be directly coupled to the bottom surface of the coupling cover. This will be described below.

Figure 4A:
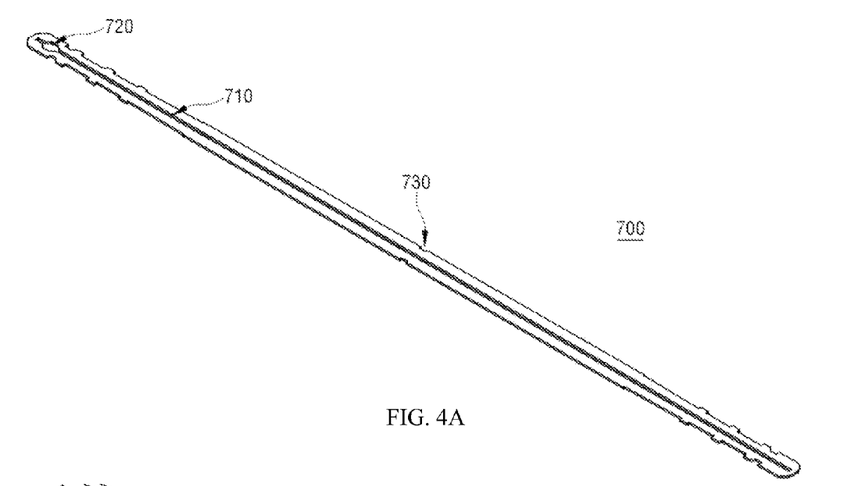
FIG. 4A is a perspective view of an elastic member according to the present invention.
Figure 4B:
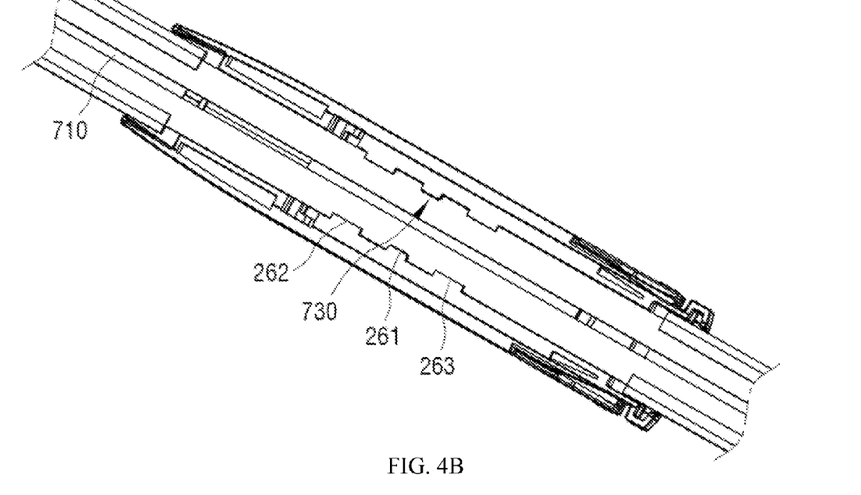
FIG. 4B is a perspective view of the elastic member and the coupling cover coupled to each other.

FIG. 4A is a perspective view of an elastic member 700 according to the present invention. FIG. 4B is a perspective view of the elastic member 700 and the coupling cover 200 coupled to each other.

Referring to FIG. 4A, the elastic member 700 according to the present invention is formed as a single elastic body. The elastic member 700 includes an contact member coupling groove 710 formed therein along a lengthwise direction of the elastic member 700. In addition, an contact member insertion groove 720 is formed at an end of the contact member coupling groove 710.

In addition, the elastic member 700 includes a fixing groove 730 formed in each of both side surfaces thereof.

Referring to FIG. 4B, to couple the elastic member 700 and the coupling cover 200 according to the present invention, the elastic member 700 is compressed in the widthwise direction thereof to reduce a width of the contact member coupling groove 710 of the elastic member 700. Then, the compressed elastic member 700 is placed in the housing portion 260 on the bottom surface of the coupling cover 200.

Here, when the elastic member 700 is placed in the housing portion 260 of the coupling cover 200, the fixing portion 261 of the coupling cover 200 is placed in the fixing groove 730 of the elastic member 700, thereby preventing the elastic member 700 from moving in the lengthwise direction.

In addition, a side surface of the elastic member 700 is inserted into the coupling grooves 264 of the coupling cover 200 and then is supported by the support portions 262 and 263, thereby preventing the elastic member 700 from moving away from the bottom surface of the coupling cover 200.

Although not shown in the drawing, an end of the contact member 600 is inserted into the contact member insertion groove 720. Then, the contact member 600 is continuously inserted into the contact member coupling groove 710 along the lengthwise direction.

As described above, according to the present invention, a structure for coupling an adapter to a coupling cover and a structure for separating the adapter from the coupling cover are provided separately. Therefore, the adapter can be easily separated from the coupling cover.

In addition, in the present invention, a pressure structure formed on a side surface of the adapter can be pressed not on a top surface of the coupling cover but on a side surface of the coupling cover without being constrained by other parts. Therefore, the adapter can be easily separated from the coupling cover.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A wiper blade assembly comprising:
   an contact member;
   an elastic member supporting the contact member;
   a cover member covering the elastic member;
   a coupling cover covering the elastic member, the coupling cover including a housing portion; and
   an adapter configured to be inserted into or removed from the housing portion of the coupling cover,
   wherein the coupling cover comprises a first coupling portion on a side of the housing portion, the adapter comprises a second coupling portion on a side thereof, the second coupling portion comprises a pressure structure and a coupling structure separated from the pressure structure by a predetermined distance, and the first coupling portion is coupled to the coupling structure,
   wherein the first coupling portion comprises a first protruding portion extending in a heightwise direction of the coupling cover and a second protruding portion extending in a lengthwise direction of the coupling cover, and the second protruding portion comprises a locking bump extending to a predetermined length and a protrusion extending in the same direction as the locking bump and extending to a length greater than the predetermined length of the locking bump, and
   wherein the pressure structure extends from a side of a body of the adapter, the pressure structure comprises a first pressure portion, a second pressure portion, and a connecting portion connecting the first pressure portion and the second pressure portion, the connecting portion including a first connecting portion connected to the first pressure portion, a second connecting portion connected to the second pressure portion, and a pressure point located in an area where the first connecting portion and the second connecting portion contact each other.

2. The wiper blade assembly of claim 1, wherein a side of the first pressure portion comprises a first connecting point connected to the side of the body of the adapter and a second connecting point connected to the first connecting portion, and a side of the second pressure portion comprises a third connecting point connected to the side of the body of the adapter and a fourth connecting point connected to the second connecting portion.

3. The wiper blade assembly of claim 2, wherein the coupling structure comprises a first support, a second support separated from the first support by a predetermined distance, a first coupling groove formed by the predetermined distance between the first support and the second support, and a second coupling groove extending from the first coupling groove.

4. The wiper blade assembly 3, wherein the first support comprises a first lengthwise support extending in a lengthwise direction of the adapter and a first widthwise support extending in a widthwise direction of the adapter, and the second support comprises a second lengthwise support extending in the lengthwise direction of the adapter and a second widthwise support extending in the widthwise direction of the adapter.

5. The wiper blade assembly of claim 4, wherein the first coupling groove is formed by a gap between the first lengthwise support and the second lengthwise support, and the second coupling groove is formed by a gap between the first widthwise support and the second widthwise support.

6. The wiper blade assembly of claim 4, wherein the locking bump is in the first coupling groove, and the protrusion is in the second coupling groove, wherein the second coupling portion of the adapter is configured to be coupled to the first coupling portion of the coupling cover as the locking bump is caught on the first widthwise support and the second widthwise support.

7. The wiper blade assembly of claim 6, wherein if the second connecting point and the fourth connecting point are pressed in a widthwise direction, the pressure point pushes the protrusion of the adapter in a lengthwise direction, and the pushed protrusion pushes the locking bump in the lengthwise direction, which causes the locking bump caught on the first widthwise support and the second widthwise support to be separated from the first widthwise support and the second widthwise support, thereby separating the second coupling portion of the adapter from the first coupling portion of the coupling cover.

* * * * *